US010466936B2

(12) United States Patent
Raitto et al.

(10) Patent No.: US 10,466,936 B2
(45) Date of Patent: Nov. 5, 2019

(54) SCALABLE, MULTI-DIMENSIONAL SEARCH FOR OPTIMAL CONFIGURATION

(71) Applicant: Oracle International Corporation, Redwood Shores, CA (US)

(72) Inventors: John Raitto, Hollis, NH (US); Uri Shaft, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 782 days.

(21) Appl. No.: 14/865,476

(22) Filed: Sep. 25, 2015

(65) Prior Publication Data

US 2016/0092134 A1  Mar. 31, 2016

Related U.S. Application Data

(60) Provisional application No. 62/056,163, filed on Sep. 26, 2014.

(51) Int. Cl.
*G06F 3/06* (2006.01)
*G06F 16/28* (2019.01)

(52) U.S. Cl.
CPC .......... *G06F 3/0673* (2013.01); *G06F 3/0608* (2013.01); *G06F 3/0632* (2013.01); *G06F 3/0638* (2013.01); *G06F 16/283* (2019.01)

(58) Field of Classification Search
CPC .......... G06F 3/06; G06F 3/0631; G06F 12/08; G06F 3/0604
USPC ....................................................... 711/170
See application file for complete search history.

(56) References Cited

U.S. PATENT DOCUMENTS

| | | | | | |
|---|---|---|---|---|---|
| 5,475,847 | A | * | 12/1995 | Ikeda | G06F 1/3215 713/322 |
| 5,485,610 | A | * | 1/1996 | Gioielli | G06F 16/2272 |
| 6,078,518 | A | * | 6/2000 | Chevallier | G11C 5/147 365/168 |
| 7,536,686 | B2 | * | 5/2009 | Tan | G06F 8/61 717/174 |
| 7,681,011 | B1 | * | 3/2010 | Shmuylovich | H04L 67/1097 711/114 |
| 8,489,816 | B1 | * | 7/2013 | Reiner | G06F 12/0897 711/118 |
| 8,868,831 | B2 | | 10/2014 | Goyal et al. | |
| 9,171,021 | B2 | * | 10/2015 | Huang | G06F 3/061 |

(Continued)

*Primary Examiner* — Mohamed M Gebril
(74) *Attorney, Agent, or Firm* — Invoke

(57) ABSTRACT

According to an embodiment, storage configurations are identified for storing items, such as database tables, partitions, or any other types of objects or data structures, within a desired storage area, such as an in-memory data store or any other limited storage resource. Each of the storage configurations is assigned to a particular item of the items. Each of the storage configurations associates the assigned particular item with one or more storage configuration options. Storage recommendations are generated for at least a set of the storage configurations. A different storage recommendation exists for each storage configuration in the set of the storage configurations. The storage recommendation associates the storage configuration with a range of possible storage sizes for a particular storage area of a system. Based on the storage recommendations, recommended system configurations a generated for different possible storage sizes of the particular storage area.

30 Claims, 3 Drawing Sheets

(56) References Cited

U.S. PATENT DOCUMENTS

| | | | |
|---|---|---|---|
| 9,229,870 B1* | 1/2016 | Kumar | G06F 12/0868 |
| 9,361,232 B2 | 6/2016 | Umamageswaran et al. | |
| 9,430,390 B2 | 8/2016 | Mukherjee et al. | |
| 9,548,929 B2* | 1/2017 | Mitsumori | H04L 49/25 |
| 9,639,562 B2 | 5/2017 | Raitto et al. | |
| 9,684,456 B1* | 6/2017 | Marshak | G06F 3/061 |
| 9,684,682 B2 | 6/2017 | Mukherjee et al. | |
| 2005/0096884 A1* | 5/2005 | Fishkin | G06F 17/50 |
| | | | 703/1 |
| 2006/0095705 A1* | 5/2006 | Wichelman | G06F 3/0605 |
| | | | 711/171 |
| 2007/0233868 A1* | 10/2007 | Tyrrell | G06F 3/0605 |
| | | | 709/226 |
| 2008/0091741 A1* | 4/2008 | Zohar | G06F 11/1092 |
| 2012/0117065 A1* | 5/2012 | Nehme | G06F 16/24532 |
| | | | 707/737 |
| 2013/0091319 A1* | 4/2013 | Cho | G06F 11/3485 |
| | | | 711/103 |
| 2013/0198449 A1* | 8/2013 | Belluomini | G06F 3/0604 |
| | | | 711/114 |
| 2015/0149736 A1* | 5/2015 | Kwon | G06F 3/0604 |
| | | | 711/147 |
| 2015/0293699 A1* | 10/2015 | Bromley | G06F 16/122 |
| | | | 711/161 |
| 2015/0301743 A1* | 10/2015 | Nagao | G06F 11/34 |
| | | | 711/113 |
| 2016/0092134 A1* | 3/2016 | Raitto | G06F 3/0673 |
| | | | 711/118 |
| 2016/0357463 A1* | 12/2016 | DeNeui | G06F 3/0619 |
| 2017/0011059 A1* | 1/2017 | Stokely | G06F 3/0617 |

* cited by examiner

SCALABLE, MULTI-DIMENSIONAL SEARCH FOR OPTIMAL CONFIGURATION

CROSS-REFERENCE TO RELATED APPLICATIONS; BENEFIT CLAIM

This application claims the benefit of Provisional Appln. 62/056,163, filed Sep. 26, 2014, the entire contents of which is hereby incorporated by reference as if fully set forth herein, under 35 U.S.C. § 119(e).

FIELD OF THE DISCLOSURE

The present disclosure relates to optimizing the performance of computer systems with limited storage resources.

BACKGROUND

In computer-based systems, storage resources are typically limited in some aspect. For instance, there may be a limit to the amount of storage space available on a hard disk or other type of persistent, non-volatile storage device. If the amount of data that one wishes to store in this storage space is larger than the size of the storage space, it becomes necessary to decide which data to store within the storage space, whether to compress or otherwise rearrange the data, and/or how to compress or arrange the data.

In some systems, the total amount of storage resources may be sufficient to store all of the available data, however it may be desirable to store some or all of the data in a smaller storage area that provides certain performance benefits when storing the data. For instance, it may be desirable to store as much of the data as possible within a volatile memory area, such as a random access memory (RAM) from which the data may be accessed more quickly than when in a non-volatile storage area. Or, it may be desirable to store as much of the data as possible within a non-volatile storage area that is of a faster speed than other types of storage, such as in a flash memory device as opposed to a traditional hard disk.

Identifying an optimal set of data elements to store within a limited storage space is often left to guesswork by the system administrator. Given an unlimited amount of time, one could methodically compare the performance of a system when storing different combinations of data elements in the desired storage area to identify an optimal combination of data elements to store. However, given the number of data elements to store and the number of options for storing those elements, it is often impractical to test combinations of data elements methodically.

Moreover, when designing a system, an administrator may make decisions regarding how much of certain types of storage areas to include in the system. An administrator typically must guess what size of storage area would be needed, and/or purchase additional resources blindly without knowing if they will have a desired effect on system performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
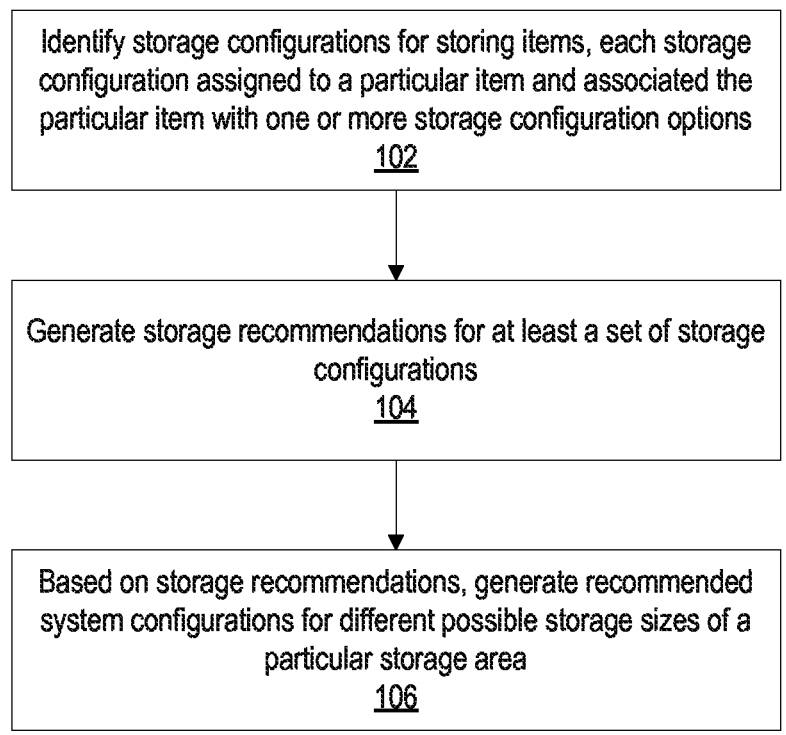
FIG. 1 is a flowchart depicting an example process for generating storage recommendations.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to an embodiment, storage configurations are identified for storing items. Each of the storage configurations is assigned to a particular item of the items. Each of the storage configurations associates the assigned particular item with one or more storage configuration options. Storage recommendations are generated for at least a set of the storage configurations. A different storage recommendation exists for each storage configuration in the set of the storage configurations. The storage recommendation associates the storage configuration with a range of possible storage sizes for a particular storage area of a system. Based on the storage recommendations, recommended system configurations are generated for different possible storage sizes of the particular storage area.

In an embodiment, each of the recommended system configurations recommends which of the items to store in the particular storage area along with which of the storage configurations to use to store the recommended items, when the system is configured such that the particular storage area is of a particular one of the possible storage sizes. In an embodiment, a "greedy search" algorithm is used to produce the recommended system configurations in a manageable amount of time. The greedy search algorithm is relatively fast and produces very good results. But, the greedy search results cannot be guaranteed to be of the highest optimality. Thus, a given recommended system configuration may not always be an optimal system configuration for the storage size for which it was generated. However, the greedy algorithm may be implemented such that the given recommended system configuration is at least a "nearly" optimal or "good enough" solution.

In an embodiment, the described methods involve, for each storage configuration of a plurality of the storage configurations: calculating a performance benefit for the storage configuration, calculating a storage cost for the storage configuration, and calculating a cost/benefit score that compares the performance benefit to the storage cost. Generating the storage recommendations then comprises, for each storage configuration in the set of the storage configurations, generating the storage recommendation for the storage configuration based on the performance benefit, storage cost, and cost/benefit score calculated for the storage configuration.

In an embodiment, a given storage recommendation for a given storage configuration indicates to use the associated one or more storage configuration options of the given storage configuration to store the particular item assigned to the given storage configuration in the particular storage area when the system is configured such that the size of the particular storage area falls within the range of the given storage recommendation. A given recommended system configuration for a given proposed size may thus be generated by including, in the given recommended system configuration, all storage configurations associated with any range that includes the given proposed size. For any given possible storage size, a sum of the storage costs calculated for all storage configurations associated with ranges that include the given possible storage size is less than or equal to the given possible storage size.

In an embodiment, the items are stored persistently on one or more storage devices outside of the particular storage area. The particular storage area, meanwhile, comprises one or more computer-readable media of faster access speed than the one or more storage devices. For instance, the one or more computer-readable media may form an in-memory cache that stores copies of the items. In an embodiment, the items are database tables or partitions of database tables.

In an embodiment, the one or more storage configuration options include options for one or more of: an attribute that selects between different compression techniques, an attribute that selects between different compression levels, an attribute that selects between storing data within a given item using a row-based or column-based format, an attribute that indicates how to distribute the given item across different nodes, or an attribute that indicates a column of the given item to project.

In an embodiment, wherein the performance benefit for a given storage configuration quantifies an estimated improvement to a system while storing the particular item assigned to the given storage configuration using the associated one or more storage configuration options of the given storage configuration. In an embodiment, the storage cost for a given storage configuration quantifies an estimated size of the particular item assigned to the given storage configuration when stored using the associated one or more storage configuration options of the given storage configuration.

In an embodiment, the items include at least a first item assigned to both a first storage configuration and a second storage configuration. A first storage recommendation associates a first range with the first storage configuration assigned to a first item, and a second storage recommendation associates a second and different range with the second storage configuration that is also assigned to the first item.

In an embodiment, the methodology for generating recommendations is such that for any given combination of a given possible storage size and a given item, the storage recommendations include at most one valid storage recommendation. In an embodiment, the methodology for generating recommendations is such that no storage recommendation will be generated for a first storage configuration assigned to a first item because a second storage configuration is assigned to a second item that includes or is the first item, and the second storage configuration has both a higher performance benefit and a higher cost/benefit score than the first storage configuration.

In an embodiment, the methodology is such that a lower range limit of a first storage recommendation is computed based on summing the storage costs of a set of storage configurations that have a higher calculated cost/benefit score than the first storage recommendation. The set of storage configurations for which the storage costs are summed does not include "superseded" storage configurations that have a higher calculated cost/benefit score but that also are already associated with a range that has an already-defined upper range limit. In an embodiment, the methodology is such that an upper range limit of a first storage recommendation for a first storage configuration assigned to a first item is determined responsive to identifying a second storage configuration assigned to a second item that includes or is the first item, and further responsive to determining that the second storage configuration has a higher performance benefit.

In an embodiment, the methodology does not necessarily consider all available items and/or storage configurations of those items. For instance, the plurality of storage configurations for which costs and/or benefits are calculated may be filtered based on one or more rules that indicate properties of items for which storage configurations are not to be generated. As another example, the set of storage configurations may be identified based on identifying all storage configurations of the plurality of storage configurations for which the calculated performance benefits are above a pre-defined threshold, or for which the calculated storage cost is below a pre-defined threshold.

The recommended system configurations may be utilized in a variety of manners. For instance, in an embodiment, an interface is generated that accepts as input a proposed storage size and outputs a given system configuration recommendation based on the proposed storage size. As another example, in an embodiment, an interface receives first input that specifies a first proposed storage size. The interface outputs a first system configuration recommendation based on the first proposed storage size and the storage recommendations. The interface receives second input that specifies a second proposed storage size that is different than the first proposed storage size. The interface outputs a second system configuration recommendation that is different than the first system configuration recommendation based on the second proposed storage size and the storage recommendations, without re-generating the storage recommendations between the first input and the second input. In an embodiment, the interface may display a sum of performance benefits for all storage configurations used in the given system configuration recommendation. In an embodiment, a graphical user interface may display an estimated benefit of increasing the proposed storage size by a certain amount, the estimated benefit being based on comparing a first sum of performance benefits for all storage configurations used in the given system configuration recommendation to a second sum of performance benefits for all storage configurations used in a second system configuration recommendation.

In an embodiment, a system may be configured to automatically cause particular items specified in a given system configuration recommendation to be stored using their recommended storage configurations.

In an embodiment, groups of the items belong to different item hierarchies. For instance, each hierarchy of the item hierarchies may comprise a database table and partitions of the database table. Storage recommendations for individual storage configurations within a hierarchy may be superseded by storage recommendations for ancestor items in the hierarchy.

In an embodiment, the storage recommendations are generated by a methodology that iterates through the plurality of storage configurations in an order based at least partially on the calculated cost/benefit score for each of the storage configurations. The methodology involves performing a single pass through the plurality of storage configurations.

In an embodiment, with each iteration, in each iteration of the single pass a next particular storage configuration of the plurality of storage configurations is selected, based on the order. The particular storage configuration is a storage configuration that is assigned to a first item of the items and has a particular calculated storage cost. When no existing storage recommendation is stored for any storage configuration that is assigned to any item that includes or is the first item, a running storage cost is incremented based on the particular calculated storage cost. A new storage recommendation is then generated that associates the particular storage configuration with a new range whose lower limit is based on the running storage cost.

In an embodiment, when an existing storage recommendation is already stored for a second storage configuration that is assigned to a second item that includes or is the first item, it is determined whether the particular storage configuration has a higher calculated performance benefit than the second storage configuration. If so, then a running storage cost is incremented based on the particular calculated storage cost. The upper limit of the existing range, if not already set, is set based on the running storage count. A new storage recommendation is then generated that associates the particular storage configuration with a new range whose lower limit is based on the running storage cost. In an embodiment, the running storage cost may further be decremented by a calculated performance cost for a given storage configuration when assigning an upper limit to an existing range associated with the given storage configuration.

In an embodiment, after generating the storage recommendations in the single pass, one or more additional passes through subsets of the storage configurations may be performed to identify additional storage recommendations for certain ranges of possible storage sizes. These certain ranges may be sizes for which the storage recommendations generated by the single pass provided less optimal results, for reasons described elsewhere in this disclosure. The subsets of the storage configurations iterated through in these additional passes are selected based on the sizes of the ranges targeted by the one or more additional passes.

FIG. 1 is a flowchart depicting an example process for generating storage recommendations. In step 102, the process identifies storage configurations for storing items, where each storage configuration is assigned to a particular item and where each storage configuration associates the assigned item with one or more storage configuration options. In step 104, the process generates storage recommendations for at least a set of storage configurations by, for each storage configuration in the set of the storage configurations, storing a storage recommendation that associates the storage configuration with a range of possible storage sizes, according to corresponding storage configuration options, for a particular storage area of a system. In step 106, the process generates recommended system configurations for different possible storage sizes of the particular storage area based on the storage recommendations.

Example System Architecture

The embodiments described herein are applicable to any computer-based system in which a desired storage area for storing data items is, or will not be, large enough to store the data items. The desired storage area may, depending on an embodiment, include any suitable type of computer-readable media, including without limitation traditional hard disks, flash memories, RAMs, or any combination(s) thereof. The data items to be stored may include, depending on the embodiment, any suitable data structure, including without limitation documents, media files, database objects, or sub-structures therein.

In an embodiment, the desired storage area of a system is a cache or other component comprised of working copies of certain data elements. For instance, the data elements may be persistently stored in relatively slow and non-volatile media. The desired storage area may be composed of faster media, such as a volatile "in-memory" storage area. Copies of certain data elements may be loaded into this faster media, where they can be accessed more quickly than in the original non-volatile media. In other embodiments, however, the desired storage area may store data elements that are not found in other media within the system.

One specific example of a system in which the techniques described herein may be practiced is a database system with an in-memory data store feature. Database tables, table partitions, tablespaces, indexes, and other database objects are stored persistently in a storage sub-system comprised of one or more storage devices. One or more database servers perform database operations with respect to the database objects in the storage sub-system. To speed up performance, one or more of the database servers make use of an in-memory data store to store data from certain database objects. The in-memory data store may be, for instance, a portion of a computing device's RAM memory that has been allocated specifically for use by the database server as the in-memory data store. The in-memory data store includes copies of certain database objects. However, the copies may not necessarily be exact clones of the certain database objects, as explained in subsequent sections.

Examples of such systems are described, without limitation, in U.S. patent application Ser. No. 14/097,575, entitled Combined Row And Columnar Storage For In-Memory Databases For OLTP And Analytics Workloads, filed by Tirthankar Lahiri, et al. on Dec. 5, 2013, and in U.S. patent application Ser. No. 12/719,264, entitled Automated Integrated High Availability Of The In-Memory Database Cache and the Backend Enterprise Database, filed by Sourav Ghosh, et al. on Mar. 8, 2010, the entire contents of each of which is incorporated herein by reference for all purposes. However, embodiments of the described techniques are not limited to any specific implementation details of the systems described therein.

Storage Configurations and Options

The storage costs and performance benefits associated with storing a given data item in a certain storage area may depend greatly on how the data item is stored. There may be a variety of possible storage configurations for the data item, each having its own associated storage cost and performance benefit. Generally, a storage configuration is a set of one or more storage options for a given data item. For instance, the manner in which an item is stored may have one or more attributes, and each of these attributes may have a number of valid options. Example attributes may include, without limitation, a storage compression technique, a storage compression level, a storage format, and/or a level of distribution or redundancy. Thus, for instance, one storage configuration may correspond to a combination of a first storage compression technique at a first storage compression level in a first format, another storage configuration may correspond to a combination of a second storage compression technique at a second storage compression level in the first format, and so forth.

For instance, the example database system described above may utilize various storage options when storing copies of database objects. As mentioned above, the copies may not necessarily be exact clones of the certain database objects. For example, for performance reasons, the in-memory data store may store a database object in a different form than found in the storage sub-system. A database server may reformat the in-memory copy of the database object so that it is optimized for certain access patterns, while keeping the underlying data of the database object the same. For instance, the database object may be stored in a row-major format in the storage sub-system, but the copy of the object in the in-memory data store may be in column-major format. This reformatting may or may not result in a reduced size for the copy of the database object. As another example, a database server may compress the in-memory copy of a database object using any of a variety of compression techniques and/or compression levels. By compressing the copy, the database server increases the amount of in-memory space available for storing in-memory copies, at the expense of additional time to compress and/or decompress the copies when they are accessed.

In an embodiment with multiple database servers, each maintaining their own in-memory data store, another storage option may specify whether to replicate a database object in each of the in-memory data stores, or to "shard" the database object across multiple in-memory data stores. In the latter case, each in-memory data store would include only a portion of the database object, thus reducing the overall amount of storage area needed within the system to store the database object, but potentially increasing the performance overhead needed for database operations involving multiple portions of the database object.

In an embodiment, another storage option to consider in a database system is whether to utilize column projection for one or more columns. That is, a "copy" of a table or table partition in the in-memory data store may simply be a partial copy comprised solely of one or more projected columns from the table or table partition.

Reformatting, compression, and any other storage option may be utilized together within a same copy of a database object.

Examples of database systems that utilize some of the above described storage options are described, without limitation, in Combined Row And Columnar Storage For In-Memory Databases For OLTP And Analytics Workloads, as cited above, and in U.S. patent application Ser. No. 13/475,669, entitled Techniques For Automatic Data Placement With Compression And Columnar Storage, filed by Amit Ganesh, et al. on May 18, 2012, and in U.S. patent application Ser. No. 13/224,327, entitled Column Domain Dictionary Compression, filed by Tirthankar Lahiri, et al. on Sep. 2, 2011, and in U.S. patent application Ser. No. 12/769,508, entitled Compression Analyzer, filed by Vineet Marwah, et al. on Apr. 28, 2010, the entire contents of each of which are incorporated by reference herein for all purposes. However, embodiments of the described technique are not necessarily limited to any particular types of storage configurations or options.

In an embodiment, each possible storage configuration for an item may be identified by taking a Cartesian product of each possible storage attribute that is available for the item. A set of all possible storage configurations for all possible items is then produced. These storage configurations constitute candidate recommendations for storage in the desired storage area. In other words, each storage configuration, together with the item to which it is assigned, corresponds to a data structure that may potentially be created and stored in the desired storage area if the storage configuration is recommended using the techniques described subsequently.

Calculating Storage Costs

In embodiments, storage costs are calculated for some or all of the storage configurations. The storage costs quantify an amount of space in the desired storage area that is needed to store the item assigned to the storage configuration using the options of the storage configuration. For instance, the storage costs may be a memory size such as 16 MB or 1 GB. Or, the storage costs may be a score intended to reflect a memory size. The storage costs may, in some cases, reflect an already known storage size for the storage configuration. For instance, if the storage configuration leaves an item unchanged from a pre-existing form of the item, the storage costs for the item should be readily determinable from the pre-existing form. Or, if the item has previously been stored using the storage configuration, an accurate size may already be stored in a log file or other record. The storage costs may include both the actual size of an item, as well as any overhead that may result from storing the item using the storage configuration.

In an embodiment, if the storage costs are not already known, the system may attempt to temporarily store the item using the storage configuration so as to determine the storage costs. However, in other embodiments, it may be undesirable to compress a large amount of data just to identify a storage cost. Instead, any of a variety of mechanisms may be used to estimate a storage cost. These mechanisms may consider factors such as an uncompressed size of the item, the nature of the data in the item, previous results from compressing or reformatting similar items, results from attempting to compress a small portion of the item, and so forth. The techniques described herein are not limited to any particular mechanism for calculating a storage cost.

In an embodiment, if the storage area is distributed across multiple nodes, the storage costs may also reflect whether the item is being stored redundantly (e.g. mirrored) and/or sharded (e.g. striped) across the nodes.

Calculating Performance Benefits

In embodiments, performance benefits are also calculated for some or all of the storage configurations. The performance benefit is some score that quantifies the impact or estimated impact of storing the item assigned to a given storage configuration in the desired storage area. The score may reflect, for instance, an amount of processor time saved or an average change in response time by virtue of having data in the item being more accessible within the desired storage area. Or, the score may more generally quantify the performance impact.

The scores may be actual scores derived by testing performance of the system with the item stored in the storage area using the given storage configuration. Or, the scores may be estimates derived based on various statistics related to the item, the storage configuration, and/or usage trends for the item and/or similar items. A variety of mechanisms may be utilized for calculating such performance benefits, and the described techniques are not limited to any particular mechanism.

In an embodiment, the performance benefits for a given item may be based at least partially upon statistics collected over time from database operations and/or overall workloads involving the given item. The statistics may indicate, for instance, how frequently the given item is accessed. The statistics may indicate, for instance, the types of operations in which data from the given item are utilized. This may be useful in embodiments in which it is more advantageous to store an item in the desired storage area for certain types of operations that for other types of operations. The statistics may further indicate whether certain portions of the item are utilized more frequently in general and/or for certain types of operations, thus indicating potential benefits to reformatting the data item to optimize access to those portions and/or to "projecting" portions of the item.

In an embodiment, the performance benefits may factor in negative consequences of storing data within the desired storage area, such as additional overhead to synchronize copies of the item or decompress the item. In some cases, the performance benefit may actually indicate that storing an item in the desired storage area has a negative total benefit. For instance, in the context of a database system with an in-memory data store, a certain item may be used overwhelmingly for a certain type of operation, such as a DML operation. It may be cheaper in terms of performance to simply perform that operation directly on the original item within the storage subsystem as opposed to on a copy of the item in the in-memory data store. This may hold true for some or all possible storage configurations of the item. Hence, there may be a negative benefit associated with some or all of the storage configurations of the item. In an embodiment, a system may be configured to never recommend a storage configuration that has a negative benefit, even if there is unlimited storage space.

Generating Storage Recommendations for Different Storage Configurations of an Item In an embodiment, recommendations for different storage configurations of various items are generated by iterating through each of the storage configurations in a single "greedy search" pass. The pass is described as a "greedy search" algorithm since it uses a "greedy" strategy—i.e. by making a locally optimal choice at each iteration with the hope of thereby finding a globally optimal solution. In many instances, the greedy strategy does not in fact produce an optimal solution, but nonetheless yields a "good enough" solution that approximates a global optimal solution in a reasonable time.

The storage configurations are sorted by some score computed using a function or other logic that compares the calculated performance benefit to the calculated storage cost. Although a variety of suitable scores may also exist, for illustrative purposes, this description often refers to this score specifically to a cost/benefit ratio. However, it should be understood that any other suitable score may be utilized in place of a cost/benefit ratio.

In an embodiment, the storage configurations are sorted in increasing order of their respective cost/benefit ratios. Configurations having negative benefit may be ignored. The storage configurations are sorted without respect to the item to which they are assigned. For instance, consider the following items, item configurations, and cost/benefit ratios.

| Item | Configuration | Cost | Benefit | Cost/Benefit |
|------|---------------|------|---------|--------------|
| A | $A_1$ | 64 | 8 | 8 |
| A | $A_2$ | 96 | 9 | 10.67 |
| B | $B_1$ | 120 | 1 | 120 |
| B | $B_2$ | 132 | 20 | 6.6 |
| B | $B_3$ | 160 | 45 | 3.56 |
| C | $C_1$ | 8 | 2 | 4 |
| C | $C_2$ | 4 | −1 | −4 |

A valid sort order for the greedy pass may be $B_3$, $C_1$, $B_2$, $A_1$, $A_2$, $B_1$. Note that $C_2$ would be ignored on account of a negative benefit.

Prior to the pass, a running cost level is initialized to zero. At each iteration of the pass, the next storage configuration in the sort order is considered. A decision is made as to whether a storage recommendation should be made for the storage configuration. A number of factors may affect the decision. For instance, if the storage configuration is for an item for which no storage configuration currently exists, a storage recommendation will generally be stored for the storage configuration. Other factors affecting this decision are described subsequently.

Whenever a storage recommendation is generated, the running cost level is incremented by the cost associated with the storage configuration. The storage recommendation includes a range of storage sizes at which the storage configuration is recommended. The lower limit of this range is initially set to the running cost level, such that the storage configuration will be recommended for all system configurations where the desired storage area is at least as big as the running cost level. The upper limit of the range, corresponding to the highest storage size at which the storage configuration will be recommended, is initially unbound, but may become bound in subsequent iterations.

For instance, after the first two iterations of passing through the example configurations given above, the following recommendations may be stored.

| Item | Configuration | Lower Limit | Upper Limit |
|------|---------------|-------------|-------------|
| B | $B_3$ | 160 | N/A |
| C | $C_1$ | 168 | N/A |

By the time a certain storage configuration for a certain item is considered, there may already be one or more recommended storage configuration for the item. If the performance benefit of the new storage configuration is less than or equal to that of a storage configuration that is already being recommended, then a decision is made to ignore the new storage configuration. For instance, in the above example, both $B_2$ and $B_1$ are ignored because, by the time $B_2$ and $B_1$ are considered, a recommendation for the higher benefit configuration $B_3$ would already exist.

However, if the performance benefit of the new storage configuration is greater than that of the storage configuration that is already recommended for the item at the current running cost level, then a new storage recommendation will be generated for the new storage configuration. The running cost level is incremented by the difference in storage cost for the new storage configuration relative to the previously recommended storage configuration. A new storage recommendation is generated for the new storage configuration in the same manner as explained above. The previously valid storage recommendation becomes invalid and superseded by the new storage recommendation at the updated running cost level, in that the upper limit of the existing storage recommendation is set to the updated running cost level. Hence, the previously valid storage recommendation will not be used for any storage size that is at or above the running cost level.

For instance, in the above example, at the time that $A_2$ is considered, the storage recommendations will be as follows:

| Item | Configuration | Lower Limit | Upper Limit |
|------|---------------|-------------|-------------|
| B    | $B_3$         | 160         | N/A         |
| C    | $C_1$         | 168         | N/A         |
| A    | $A_1$         | 232         | N/A         |

Upon consideration of $A_2$, since the performance benefit of $A_2$ is higher than that of $A_1$, a new storage recommendation for $A_2$ is generated, and the storage recommendation for $A_1$ is superseded for storage sizes above the current running cost level of 264.

| Item | Configuration | Lower Limit | Upper Limit |
|------|---------------|-------------|-------------|
| B    | $B_3$         | 160         | N/A         |
| C    | $C_1$         | 168         | N/A         |
| A    | $A_1$         | 232         | 264         |
|      | $A_2$         | 264         | N/A         |

In other embodiments, a number of modifications may be made to the above-described algorithm so as to arrive at a similar set of storage recommendations. Embodiments are not necessarily limited to the exact implementation details given above.

For instance, in an embodiment, there is not concept of superseding storage configurations, and multiple copies of an item may be stored using different storage configurations.

Related Items

In an embodiment, certain items eligible for storage in the desired storage area may be part of, or include, other items. For instance, in a database system, both tables and partitions of those tables (as well as subpartitions) may be stored in the in-memory data store. This is because, in some cases, it may be highly beneficial to use a certain storage configuration store an item that is contained in another item, such as a partition of the table, but not as highly beneficial to use that storage configuration to store other items contained in that item, such as other partitions of the table. Hence, individual portions of an item may be considered separate items for the purposes of the techniques described herein.

In an embodiment, certain sub-items of a parent item may be eliminated from consideration during the pass for various reasons. For instance, in some contexts where the sub-items are all frequently accessed, commonly accessed together, or access with the same regularity, performance may actually be degraded if only some of the sub-items are stored in the desired storage area. Hence, a rule may be created that eliminates the sub-items from consideration under such circumstances.

In an embodiment, the decision as to whether generate a storage recommendation for a given storage configuration for a given item may be based in part on the relationship of the item to a hierarchy of items of which it is a member. The hierarchy includes a group of items that are contained within a same item. The containing item is at the head of the hierarchy. Each of the remaining items in the hierarchy descends from the smallest item in the hierarchy that wholly contains it.

In an embodiment, when deciding whether to generate a storage recommendation for a given configuration of a given item, if the given item is or includes other item(s) for which there are already storage recommendations, then a storage recommendation is generated only if the benefit of the given configuration is greater than the sum of the benefits associated with the currently valid storage recommendation(s) for the other item(s). When this is the case, each of the currently valid storage recommendation(s) for the other item(s) is superseded at storage sizes greater than the previous running cost level plus the cost of the given configuration minus the costs associated with the superseded storage recommendation(s). For instance, in the previous example, suppose item C is a sub-item within A. The storage recommendation for $A_1$ would supersede the recommendation for $C_1$ at storage sizes above 222.

If the given item is contained within a parent item for which there is already a storage recommendation, then different actions may be taken, depending on the embodiment. For instance, under such circumstances, the storage configuration for the given item may always be ignored. In another embodiment, a new storage recommendation is generated only if the benefit of the given configuration is greater than that of the existing storage recommendation. Depending on the embodiment, the existing storage recommendation may or may not be superseded. In an embodiment, if the parent item is superseded, any previously superseded recommendations for sibling items of the given item within the hierarchy may be reinstated at the current running cost level. In other embodiments, to limit the occurrence of such situations, a parent item having one or more descendent items whose benefits are negative may be filtered before passing through the set of items, along with the descendent items.

Generating Recommended System Configurations

In an embodiment, an overall system configuration may be recommended for a given storage size based on the individual storage recommendations. For instance, a target storage size may be selected. The individual storage recommendations may be searched for all recommendations having a range that includes the target storage size. The storage configurations associated with the located recommendations may then be collectively recommended a system configuration.

In an embodiment, once the individual storage recommendations have been generated for the various storage configurations, recommended system configurations may be generated for any number of possible storage sizes without needing to regenerate the individual storage recommendations. The ranges associated with the storage recommendations allow recommended system configurations to be generated for any arbitrary target storage size, thus avoiding the need to fully reanalyze the data items and storage configurations each time the target storage size changes.

For instance, continuing with the example storage configurations and recommendations given above, a set of recommended system configurations may include:

| Target Storage Size | Included Storage Configurations | Total Benefit |
|---|---|---|
| 160 | $B_3$ | 45 |
| 192 | $B_3, C_1$ | 47 |
| 224 | $B_3, C_1$ | 47 |
| 256 | $B_3, C_1, A_1$ | 55 |
| 288 | $B_3, C_1, A_2$ | 56 |

Storage Advisor

In an embodiment, the recommendation results can be summarized in a list of sizes each with a determined or estimated benefit. An embodiment could use this summarized list as information to provide to a user to aid in the selection of a size. An embodiment could also use this summarized list to be employed by an automated system configuration utility that automatically reconfigures the system by reallocating various storage configurations for different system purposes.

In an embodiment, a graphical user interface depicts a number of different possible storage sizes for a storage area, along with scores indicating, for each possible storage size, an performance benefit to be gained (or estimated for) using that storage size. For instance, the interface may select a default set of storage sizes spread out at equal intervals, or the interface may allow a user to specify storage sizes of interest. For each possible storage size, a recommended system configuration is generated. The score for the possible storage size may be based on the performance benefits calculated for each storage configuration within the recommended system configuration. For instance, the score may be a sum or other function of the individual performance benefits. A system administrator may click or otherwise select one of the listed storage sizes to obtain a detailed report of which items are recommended to be stored in the storage area, along with which storage configuration to use for the items.

Multiple Pass Embodiments

In some embodiments, it may be desirable to increase the granularity at which different recommended system configurations are possible by performing one or more additional passes of the "greedy search" algorithm described above. There may be various "gaps" in possible storage sizes at which more optimal system configurations may be apparent, but not recommended on account of a higher cost item having a relatively low cost-benefit ratio. For instance, in the example recommendations given earlier in this application, the "recommended" system configuration between sizes 0 and 160 would not include any items at all, even though it would quite clearly be optimal to place at least some item in the desired storage area. Similarly, suppose a storage recommendation recommended storing a 1 GB item at sizes beginning with 1.5 GB. Unfortunately, for sizes between 0.5 GB and 1.5 GB, there would be no additional items to recommend storing in the storage area, even though there may be plenty of room for additional items.

The techniques described herein may thus be improved by generating sub-recommendations for gaps above a threshold size. The sub-recommendations are generated by performing another pass on the storage configurations, starting with a running cost level equal to the lower boundary of the gap, and ignoring all storage configurations that are already recommended for storage sizes up to the upper boundary of the gap or that have a storage cost that is larger than the gap. When the running cost level reaches the upper boundary of the gap, the pass may be terminated. Each sub-recommendation has a range whose upper limit is bounded by the upper boundary of the gap. If, yet other gaps exist between sub-recommendations, yet additional passes may be performed to identify yet other sub-recommendations.

In other embodiments, each item configuration recommendation may employ a list of lower and upper limits to allow an item storage configuration to be recommended with a variety of size ranges.

An embodiment could employ a recursive method to run multiple short greedy search passes between each upper and lower limit determined by the previous pass until it is determined that no candidate item configurations remain within that range.

For instance, a second pass performed to fill in the gap between 0 and 160 in the example recommendations given above might result in recommendations such as follows:

| Item | Configuration | Lower Limit | Upper Limit |
|---|---|---|---|
| C | $C_1$ | 8 | 160 |
| B | $B_2$ | 140 | 160 |
| B | $B_3$ | 160 | N/A |
| C | $C_1$ | 168 | N/A |
| A | $A_1$ | 232 | 264 |
|   | $A_2$ | 264 | N/A |

A third pass performed to fill in the gap between 8 and 140 in the example recommendations given above might result in recommendations such as follows:

| Item | Configuration | Lower Limit | Upper Limit |
|---|---|---|---|
| C | $C_1$ | 8 | 160 |
| A | $A_1$ | 72 | 104 |
|   | $A_2$ | 104 | 140 |
| B | $B_2$ | 140 | 160 |
| B | $B_3$ | 160 | N/A |
| C | $C_1$ | 168 | N/A |
| A | $A_1$ | 232 | 264 |
|   | $A_2$ | 264 | N/A |

Example Implementation

This section describes in detail an example implementation of the described techniques, according to an embodiment, for purposes of illustration. Other embodiments are not necessarily limited to the specific details described herein.

In an embodiment, the described techniques are employed in a system that consists of a large number of items (e.g. tens of thousands or millions or more). Each of these items has a number of attributes. Each attribute has a set of configuration options. Some item attribute options may depend upon other item attribute options: Certain combinations of attribute options may be restricted for a given item. Other item attribute options may be independent. Each item attribute option provides a configuration benefit which can be higher or lower than other options for the same item attribute. In addition, the benefit can depend in part on other item attribute option selections. Similarly, each item attribute option comes with a configuration cost which can be higher or lower than other options for the same item attribute. And the cost can also depend in part upon other item attribute option selections.

One could configure the system by setting the cost to a certain maximum. Then one could compute the cost and benefit of all combinations of item attribute options for all items, eliminating restricted item attribute options. Then one could choose the highest benefit combination of item attribute options that falls within the maximum cost. However, while this solution can work with a small number of items and a small number of item attributes and a small number of item attribute options, it does not scale to large numbers of items, item attributes or item attribute options. In addition, this solution is highly time consuming for even small numbers of choices. And, if the maximum cost is changed, which is typical with system expansion, the highly time consuming computation of the optimal configuration must be completely recomputed. Finally, this solution provides no information to aid in the choice of the maximum cost: To determine the estimated benefit for a given cost, a highly time consuming search must be performed for each maximum cost value to be considered.

Instead, in accordance with the described techniques, the system may be configured using a highly scalable, single pass greedy search for a very large number of items with multiple attributes to be chosen (a multi-dimensional search). The search results may show the maximum benefit for a given cost value or the maximum cost for a given benefit value. These value enable selection of an optimal cost value or optimal benefit value. The search results instantly produce an at least nearly optimal configuration given a specific maximum cost value or a specific maximum benefit value with no need to re-perform the optimizing search for different maximum cost or benefit values. This new, scalable solution provides at least nearly optimal system configurations with multiple dimensions of attributes and very large numbers of items to configure, with minimal optimization overhead and all essential information needed to optimize the configuration.

Figure 2:
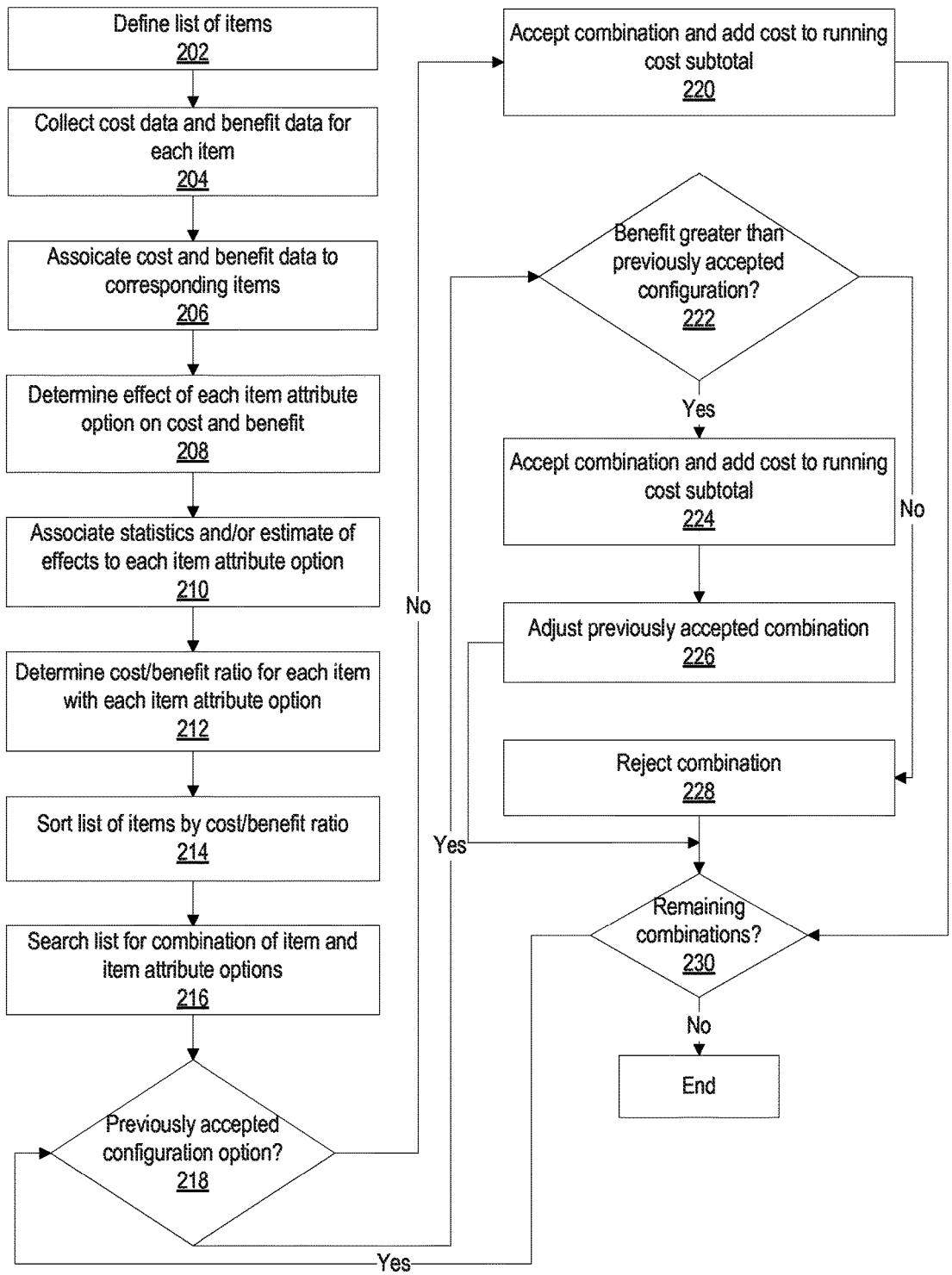
FIG. 2 is a flowchart depicting an example process for generating a list of decisions identifying storage recommendations.

FIG. 2 is a flowchart depicting an example process for generating a list of decisions identifying storage recommendations. In step 202, the process begins by first defining a list of all items. Then, in step 204, the system gathers data and statistics for each item, including costs (for example, disk or memory size) and benefits (for example, degree of usage). In step, 206, the system attaches the data and statistics to the items. In step 208, the system then defines a list of all item attributes (for example, storage type, data compression type, data distribution method, etc.). In step 208, the system gathers data, statistics, and/or estimates of the effect on cost and benefit for each item attribute option (for example, benefits and costs for tape drives, standard disk drives, RAID disk arrays, flash memory, RAM storage, CPU cache and other types of storage, etc.). This data, statistics and/or estimates are then attached to the item attribute options in step 210.

In step 212, the estimated cost, benefit, and cost/benefit ratio are then computed for each item with each attribute option. This step may involve joining the items with their attributes using a Cartesian product. In step 214, the list of items, joined with item attribute options, is then sorted in increasing order of cost/benefit ratio.

The system is now ready to pass through the sorted list. In step 216, the system searches the list for combinations of items and options. During this step, a running cost subtotal may be initialized (e.g., to zero). For each item/option combination:

In step 218, the system determines if there are no previously accepted configuration options for the current item. If there are no previously accepted configuration options for the current item, then in step 220, the system accepts the combination, adds its cost to the running cost subtotal, and marks the combination to be used with a maximum cost that is greater than or equal to the current running cost subtotal.

If there is a previously accepted configuration option for the current item, then in step 222, the system determines if the benefit of the current item with the current item attribute options is higher than the benefit of the previous item decision with different item options, the system supersedes the previous decision for the same item with different attribute options. If the benefit of the current item with the current item attributes is higher, then in step 224 the system adds the cost of the current item with the current item options to the running cost subtotal. Then, in step 226, the system sets the previous item decision with the different item attribute options to be used only with a maximum cost value that is less than the current cost subtotal. The system sets the current item with its configuration attribute options to be used with a maximum cost value that is greater than or equal to the current running cost subtotal.

If the benefit of the current item with the current item attribute options is not higher than the benefit of the previous item decision with different item options, then, in step 228, since the current item with its item attribute options does not provide a greater benefit, the combination is rejected. In step 230, the system determines whether there are remaining combinations to analyze on the sorted list. If so, then the process selects another combination and repeats steps 218 to 228 for the combination. Otherwise the process ends.

After the single pass, multi-dimensional greedy search is complete, the system has now arrived at a list of decisions. For each decision that was accepted, there is a minimum cost value. Some of the decisions that were accepted also have a maximum cost value, as these decisions were superseded by subsequent decisions.

In an embodiment, this list of decisions can now be used to quickly form a list of (cost, benefit) value pairs using a technique such as follows. The system chooses the number (N) of (cost, benefit) pairs to be generated. The maximum cost subtotal assigned to a decision is divided by the number (N) of (cost, benefit) pairs to be generated. The system iterates over the N maximum cost values. For each maximum cost value, the system computes the sum of the total benefit for all decisions that were accepted and not superseded with the current maximum cost value. From the above generated list of (cost, benefit) pairs, a maximum cost may be chosen.

The system may then generate an optimal or nearly optimal configuration by employing all decisions that were accepted and not superseded with the chosen maximum cost. The step can be performed virtually instantaneously and can be repeated to change the chosen maximum cost as the system expands.

This solution is applicable to any system configuration that has a number of configuration items with a number of configuration item attributes, each with a number of options. It can also be applied to any multi-dimensional/multiple item search for an optimal combination.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
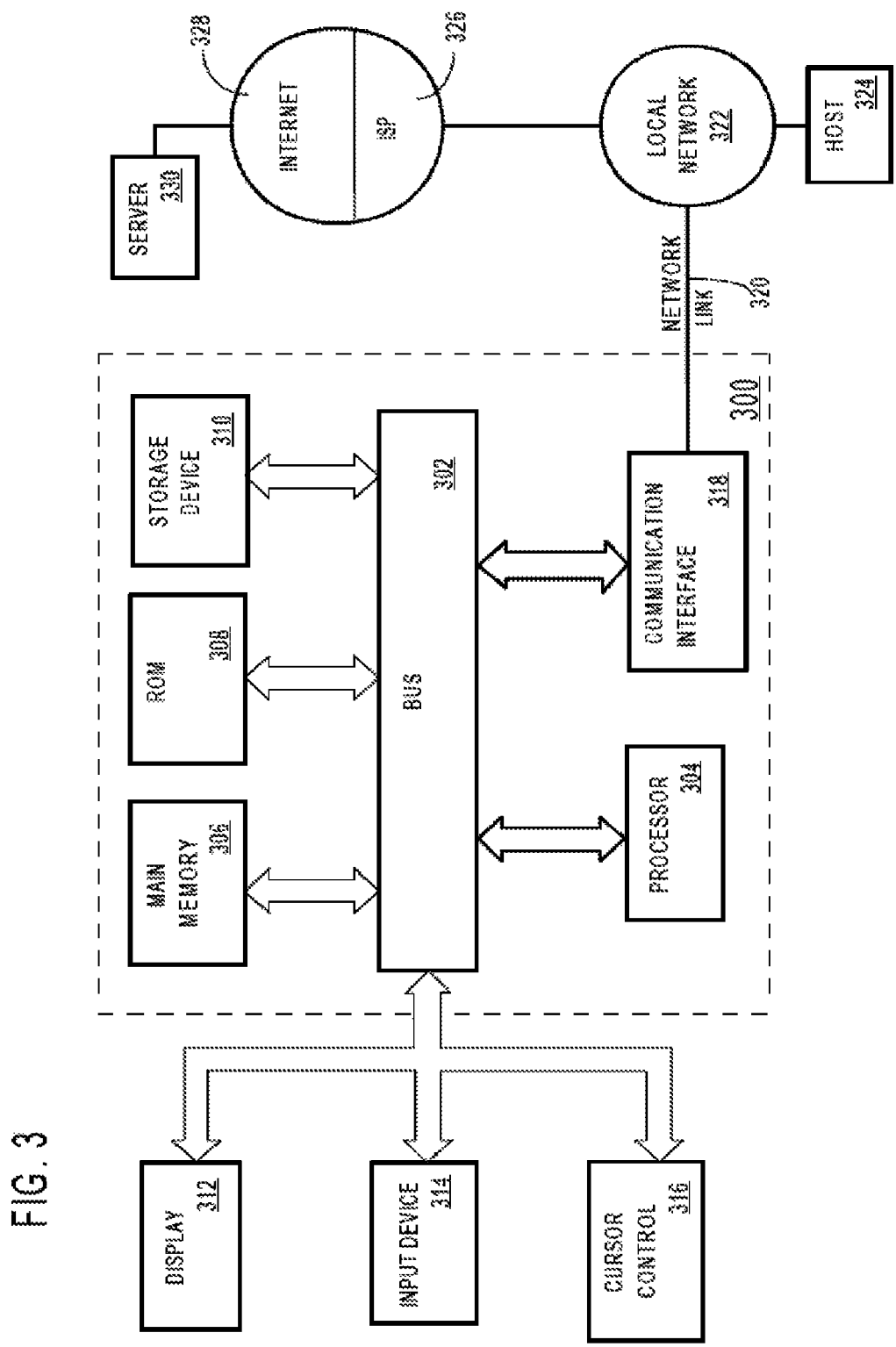
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
  identifying a plurality of storage configurations for storing a plurality of items, each storage configuration of the plurality of storage configurations assigned to at least one item of the plurality of items such that a particular item in the plurality of items is associated with two or more storage configuration options;
  generating a plurality of storage recommendations for the plurality of items by, for each storage configuration in a set of storage configurations assigned to the particular item of the plurality of items, storing a storage recommendation, of the plurality of storage recommendations, that associates the storage configuration with a range of storage sizes, according to corresponding storage configuration options, for a particular storage area of a system;
  wherein the plurality of storage recommendations include at least a first storage recommendation and a second storage recommendation for the particular item in the plurality of items, wherein the first storage recommendation recommends a first storage configuration for the particular item for a first range of storage sizes between a first lower limit and a first upper limit;
  wherein the first lower limit is determined based on summing storage costs of a set of storage configurations that have a higher calculated cost/benefit score than the first storage recommendation and are not already associated with a range that has an already-defined upper range limit;
  based on the plurality of storage recommendations including the first storage recommendation and the second storage recommendation, generating recommended system configurations for different available storage sizes of the particular storage area.

2. The method of claim 1, further comprising:
  for each storage configuration of the plurality of the storage configurations:
    calculating a score that is based on at least one of:
    a performance benefit for the storage configuration;
    a storage cost for the storage configuration; or
    a cost/benefit score that compares the performance benefit to the storage cost;
  wherein generating the plurality of storage recommendations comprises, for each storage configuration in the plurality of the storage configurations, generating the storage recommendation for the storage configuration based on the score calculated for the storage configuration.

3. The method of claim 1, wherein each of the recommended system configurations recommends which of the items to store in the particular storage area along with which of the storage configurations to use to store the recommended items, when the system is configured such that the particular storage area is of a particular one of the different available storage sizes.

4. The method of claim 1, wherein a given storage recommendation for a given storage configuration indicates to use a corresponding set of one or more storage configuration options of the given storage configuration to store a given item assigned to the given storage configuration in the particular storage area when the system is configured such that the size of the particular storage area falls within a range of the given storage recommendation.

5. The method of claim 1,
  wherein the items are stored persistently on one or more storage devices outside of the particular storage area,
  wherein the particular storage area comprises one or more computer-readable media of faster access speed than the one or more storage devices;
  wherein the one or more computer-readable media form an in-memory cache storing copies of the items.

6. The method of claim 1, wherein groups of the plurality of items belong to different item hierarchies; wherein descendent items within a given hierarchy are components of an ancestor item within the given hierarchy, wherein a storage recommendation for the ancestor item supersedes storage recommendations for the descendent items.

7. The method of claim 1, wherein for any given available storage size, a sum of storage costs calculated for all storage configurations associated with ranges that include the given available storage size is less than or equal to the given available storage size.

8. The method of claim 1, wherein the two or more storage configuration options include options for one or more of: an attribute that selects between different compression techniques, an attribute that selects between different compression levels, an attribute that selects between storing data within a given item using a row-based or column-based format, an attribute that indicates how to distribute the given item across different nodes, or an attribute that indicates a column of the given item to project.

9. The method of claim 1, further comprising not generating any storage recommendation for a third storage configuration assigned to a first item because a fourth storage configuration is assigned to a second item that includes or is the first item, and the fourth storage configuration has both a higher performance benefit and a higher cost/benefit score than the third storage configuration.

10. The method of claim 1, further comprising
generating an interface that accepts as input a proposed storage size and outputs a given system configuration recommendation based on the proposed storage size;
receiving first input that specifies a first proposed storage size;
outputting a first system configuration recommendation based on the first proposed storage size and the plurality of storage recommendations;
receiving second input that specifies a second proposed storage size that is different than the first proposed storage size;
outputting a second system configuration recommendation that is different than the first system configuration recommendation based on the second proposed storage size and the plurality of storage recommendations, without re-generating the storage recommendations between the first input and the second input.

11. The method of claim 1, further comprising automatically causing particular items specified in a given system configuration recommendation to be stored using their recommended storage configurations.

12. One or more non-transitory computer-readable media storing instructions that, when executed by one or more computing devices, causes performance of:
identifying a plurality of storage configurations for storing a plurality of items, each storage configuration of the plurality of storage configurations assigned to at least one item of the plurality of items such that a particular item in the plurality of items is associated with two or more storage configuration options;
generating a plurality of storage recommendations for the plurality of items by, for each storage configuration in a set of storage configurations assigned to the particular item of the plurality of items, storing a storage recommendation, of the plurality of storage recommendations, that associates the storage configuration with a range of storage sizes, according to corresponding storage configuration options, for a particular storage area of a system;
wherein the plurality of storage recommendations include at least a first storage recommendation and a second storage recommendation for the particular item in the plurality of items, wherein the first storage recommendation recommends a first storage configuration for the particular item for a first range of storage sizes between a first lower limit and a first upper limit;
wherein the first lower limit is determined based on summing storage costs of a set of storage configurations that have a higher calculated cost/benefit score than the first storage recommendation and are not already associated with a range that has an already-defined upper range limit;
based on the plurality of storage recommendations including the first storage recommendation and the second storage recommendation, generating recommended system configurations for different available storage sizes of the particular storage area.

13. The one or more non-transitory computer-readable media of claim 12, wherein the instructions further cause performance of:
for each storage configuration of the plurality of the storage configurations:
calculating a score that is based on at least one of:
a performance benefit for the storage configuration;
a storage cost for the storage configuration; or
a cost/benefit score that compares the performance benefit to the storage cost;
wherein generating the plurality of storage recommendations comprises, for each storage configuration in the plurality of the storage configurations, generating the storage recommendation for the storage configuration based on the score calculated for the storage configuration.

14. The one or more non-transitory computer-readable media of claim 12, wherein each of the recommended system configurations recommends which of the items to store in the particular storage area along with which of the storage configurations to use to store the recommended items, when the system is configured such that the particular storage area is of a particular one of the different available storage sizes.

15. The one or more non-transitory computer-readable media of claims 12, wherein a given storage recommendation for a given storage configuration indicates to use a corresponding set of one or more storage configuration options of the given storage configuration to store a given item assigned to the given storage configuration in the particular storage area when the system is configured such that the size of the particular storage area falls within a range of the given storage recommendation.

16. The one or more non-transitory computer-readable media of claim 12,
wherein the items are stored persistently on one or more storage devices outside of the particular storage area, wherein the particular storage area comprises one or more computer-readable media of faster access speed than the one or more storage devices;
wherein the one or more computer-readable media form an in-memory cache storing copies of the items.

17. The one or more non-transitory computer-readable media of claim 12, wherein groups of the plurality of items belong to different item hierarchies; wherein descendent items within a hierarchy are components of an ancestor item within a hierarchy, wherein a storage recommendation for the ancestor item supersedes storage recommendations for the descendent items.

18. The one or more non-transitory computer-readable media of claim 12, wherein for any given available storage size, a sum of the storage costs calculated for all storage configurations associated with ranges that include the given available storage size is less than or equal to the given available storage size.

19. The one or more non-transitory computer-readable media of claim 12, wherein the two or more storage configuration options include options for one or more of: an attribute that selects between different compression techniques, an attribute that selects between different compression levels, an attribute that selects between storing data within a given item using a row-based or column-based format, an attribute that indicates how to distribute the given item across different nodes, or an attribute that indicates a column of the given item to project.

20. The one or more non-transitory computer-readable media of claim 12, wherein the instructions further cause performance of not generating any storage recommendation for a third storage configuration assigned to a first item because a fourth storage configuration is assigned to a second item that includes or is the first item, and the fourth storage configuration has both a higher performance benefit and a higher cost/benefit score than the third storage configuration.

21. The one or more non-transitory computer-readable media of claim 12, wherein the instructions further cause performance of:
generating an interface that accepts as input a proposed storage size and outputs a given system configuration recommendation based on the proposed storage size;
receiving first input that specifies a first proposed storage size;
outputting a first system configuration recommendation based on the first proposed storage size and the plurality of storage recommendations;
receiving second input that specifies a second proposed storage size that is different than the first proposed storage size;
outputting a second system configuration recommendation that is different than the first system configuration recommendation based on the second proposed storage size and the plurality of storage recommendations, without re-generating the storage recommendations between the first input and the second input.

22. The one or more non-transitory computer-readable media of claim 12, wherein the instructions further cause performance of automatically causing particular items specified in a given system configuration recommendation to be stored using their recommended storage configurations.

23. A system comprising:
one or more hardware processors;
one or more non-transitory computer-readable media storing instructions that, when executed by the one or more hardware processors, causes operations comprising:
identifying a plurality of storage configurations for storing a plurality of items, each storage configuration of the plurality of storage configurations assigned to at least one item of the plurality of items such that a particular item in the plurality of items is associated with two or more storage configuration options;
generating a plurality of storage recommendations for the plurality of items by, for each storage configuration in a set of storage configurations assigned to the particular item of the plurality of items, storing a storage recommendation, of the plurality of storage recommendations, that associates the storage configuration with a range of storage sizes, according to corresponding storage configuration options, for a particular storage area of the system;
wherein the plurality of storage recommendations include at least a first storage recommendation and a second storage recommendation for the particular item in the plurality of items, wherein the first storage recommendation recommends a first storage configuration for the particular item for a first range of storage sizes between a first lower limit and a first upper limit;
wherein the first lower limit is determined based on summing storage costs of a set of storage configurations that have a higher calculated cost/benefit score than the first storage recommendation and are not already associated with a range that has an already-defined upper range limit;
based on the plurality of storage recommendations including the first storage recommendation and the second storage recommendation, generating recommended system configurations for different available storage sizes of the particular storage area.

24. The system of claim 23, wherein the instructions further cause operations comprising:
for each storage configuration of the plurality of the storage configurations:
calculating a score that is based on at least one of:
a performance benefit for the storage configuration;
a storage cost for the storage configuration; or
a cost/benefit score that compares the performance benefit to the storage cost;
wherein generating the plurality of storage recommendations comprises, for each storage configuration in the plurality of the storage configurations, generating the storage recommendation for the storage configuration based on the score calculated for the storage configuration.

25. The system of claim 23, wherein each of the recommended system configurations recommends which of the items to store in the particular storage area along with which of the storage configurations to use to store the recommended items, when the system is configured such that the particular storage area is of a particular one of the different available storage sizes.

26. The system of claim 23, wherein a given storage recommendation for a given storage configuration indicates to use a corresponding set of one or more storage configuration options of the given storage configuration to store a given item assigned to the given storage configuration in the particular storage area when the system is configured such that the size of the particular storage area falls within a range of the given storage recommendation.

27. The system of claim 23,
wherein the items are stored persistently on one or more storage devices outside of the particular storage area, wherein the particular storage area comprises one or more computer-readable media of faster access speed than the one or more storage devices;
wherein the one or more computer-readable media form an in-memory cache storing copies of the items.

28. The system of claim 23, wherein groups of the plurality of items belong to different item hierarchies; wherein descendent items within a hierarchy are components of an ancestor item within a hierarchy, wherein a storage recommendation for the ancestor item supersedes storage recommendations for the descendent items.

29. The system of claim 23, wherein for any given available storage size, a sum of the storage costs calculated for all storage configurations associated with ranges that include the given available storage size is less than or equal to the given available storage size.

30. The system of claim 23, wherein the two or more storage configuration options include options for one or more of: an attribute that selects between different compression techniques, an attribute that selects between different compression levels, an attribute that selects between storing data within a given item using a row-based or column-based format, an attribute that indicates how to distribute the given item across different nodes, or an attribute that indicates a column of the given item to project.

* * * * *

UNITED STATES PATENT AND TRADEMARK OFFICE
CERTIFICATE OF CORRECTION

PATENT NO. : 10,466,936 B2  
APPLICATION NO. : 14/865476  
DATED : November 5, 2019  
INVENTOR(S) : Raitto et al.

Page 1 of 1

It is certified that error appears in the above-identified patent and that said Letters Patent is hereby corrected as shown below:

On the Title Page

Column 2, under Abstract, Line 16, delete "configurations a" and insert -- configurations are --, therefor.

In the Drawings

On sheet 2 of 3, in FIG. 2, under Reference Numeral 206, Line 1, delete "Assoicate" and insert -- Associate --, therefor.

In the Claims

In Column 22, Line 23, in Claim 15, delete "claims" and insert -- claim --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*